(12) United States Patent
Hackl et al.

(10) Patent No.: US 10,427,648 B2
(45) Date of Patent: Oct. 1, 2019

(54) FILM HINGE FOR A WINDSHIELD WIPER DEVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE); Attila Geleta, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 14/917,429

(22) PCT Filed: Aug. 7, 2014

(86) PCT No.: PCT/EP2014/066957
§ 371 (c)(1),
(2) Date: Mar. 8, 2016

(87) PCT Pub. No.: WO2015/032579
PCT Pub. Date: Mar. 12, 2015

(65) Prior Publication Data
US 2016/0221542 A1    Aug. 4, 2016

(30) Foreign Application Priority Data

Sep. 9, 2013    (DE) .................. 10 2013 217 981

(51) Int. Cl.
*B60S 1/38*    (2006.01)
*B60S 1/04*    (2006.01)
(Continued)

(52) U.S. Cl.
CPC .............. *B60S 1/3801* (2013.01); *B60S 1/04* (2013.01); *B60S 1/0455* (2013.01); *B60S 1/16* (2013.01);
(Continued)

(58) Field of Classification Search
CPC ...... B60S 1/32; B60S 1/04; B60S 1/16; B60S 1/38; B60S 1/3801; B60S 1/0455
(Continued)

(56) References Cited

U.S. PATENT DOCUMENTS

| | | | |
|---|---|---|---|
| 3,131,414 A | * | 5/1964 | Wise ..................... B60S 1/38 15/250.32 |
| 5,472,379 A | | 12/1995 | Andress et al. |
| 2013/0104334 A1 | | 5/2013 | Depondt |

FOREIGN PATENT DOCUMENTS

| | | |
|---|---|---|
| DE | 1918917 A1 | 10/1970 |
| DE | 2315454 | 11/1973 |

(Continued)

OTHER PUBLICATIONS

International Search Report for Application No. PCT/EP2014/066957 dated Nov. 17, 2014 (English Translation, 2 pages).

*Primary Examiner* — Monica S Carter
*Assistant Examiner* — Katina N. Henson
(74) *Attorney, Agent, or Firm* — Michael Best & Friedrich LLP (57) ABSTRACT

The present invention relates to a windscreen wiping device (100) for a vehicle, comprising a wiper blade (2) with an elongate upper part (10) and an elongate lower part (12), which are configured to be at least partially bendable. Furthermore, a plurality of connecting elements (18) for connecting the upper part (10) and the lower part (12) are provided, said connecting elements being spaced apart from one another along a longitudinal extent (8) of the wiper blade (2) and being designed to permit a movement of the upper part (10) and of the lower part relative to each other with a movement component along a longitudinal extent (8) of the wiper blade (2). Furthermore, a multiplicity of the plurality of connecting elements (18) are connected to the upper part (10) via a first film hinge in each case and to the (Continued)

lower part (12) via a second film hinge in each case. Furthermore, a film-hinge stop device is provided in order to limit a rotational movement of the connecting elements (18) relative to at least one part from the elongate upper part and the elongate lower part.

18 Claims, 6 Drawing Sheets

(51) Int. Cl.
*B60S 1/32* (2006.01)
*B60S 1/16* (2006.01)
*B60S 1/34* (2006.01)

(52) U.S. Cl.
CPC ............... *B60S 1/32* (2013.01); *B60S 1/3411* (2013.01); *B60S 1/38* (2013.01); *B60S 2001/3812* (2013.01); *B60S 2001/3815* (2013.01)

(58) Field of Classification Search
USPC ..................... 15/250.44, 250.361, 257.01
See application file for complete search history.

(56) References Cited

FOREIGN PATENT DOCUMENTS

| | | | | |
|---|---|---|---|---|
| DE | 29813251 U1 | 11/1998 | | |
| DE | 19754449 A1 | * 5/1999 | ................ | B60S 1/38 |
| FR | 2248174 | 5/1975 | | |
| FR | 2563481 A1 | * 10/1985 | ................ | B60S 1/32 |
| GB | 2336765 | 11/1999 | | |
| WO | 2015007350 A1 | 1/2015 | | |

* cited by examiner

FILM HINGE FOR A WINDSHIELD WIPER DEVICE

BACKGROUND OF THE INVENTION

The invention relates to a windshield wiper device for a vehicle, in particular a motor vehicle, and furthermore in particular to a film hinge.

Windshield wiper devices typically have a wiper arm or wiper lever, wherein a wiper blade is moved over the windshield of a motor vehicle. In this case, the wiper blade is moved between a first turning position and a second turning position. For this purpose, the wiper arm is connected to a wiper motor via the drive shaft. Particularly on windshields with pronounced changes in curvature, the wiper blade easily loses contact with the windshield. Particularly in the case of windshields with pronounced curvature, this can lead to unwiped wiping regions or to fogging.

Since a wiping operation has to be optimized to a large number of parameters, for example a quantity of rain on the windshield, a possible snow load on the windshield, the speed of the vehicle and the associated wind pressure on the wiper arm, fogging cannot be reliably prevented in a simple manner by adapting the pressure of the wiper arm on the windshield. There is therefore a requirement to further improve windshield wiper devices.

There are a plurality of boundary conditions which additionally have to be taken into consideration when improving windshield wiper devices. These boundary conditions include the expenditure during production or the production costs, the material costs, and also the properties of the windshield wiper device, in particular operation under diverse conditions and longevity under a multiplicity of conditions. In the case of wiper devices for vehicles, it is necessary to take into account the fact that the cost pressure increases continuously and that the vehicles may be used in a wide variety of climatic conditions, such that extreme temperature values for example arise permanently and/or with large variations. In addition, windshield wiper devices are exposed to various instances of loading, for example wind pressure loading or loading when travelling through a car wash, which they have to withstand. In this case, the joints in particular of windshield wiper devices are particularly susceptible to damage.

SUMMARY OF THE INVENTION

It is an object of the present invention to provide a windshield wiper device with which at least one or more of the aforementioned disadvantages are reduced or essentially do not arise and/or with which reliable, largely fog-free wiping of a windshield of a vehicle is ensured.

According to embodiments of the present invention, what is proposed is a windshield wiper device for a vehicle, in particular a motor vehicle. The windshield wiper device comprises a wiper blade having an elongated top part and an elongated bottom part, which are configured to be at least partially bendable. Furthermore, provision is made of a plurality of connecting elements for connecting the top part and the bottom part, wherein the connecting elements are spaced apart from one another along a longitudinal extent of the wiper blade. The connecting elements are configured to allow for a movement of the top part and of the bottom part in relation to one another with a movement component along a longitudinal extent of the wiper blade. Furthermore, the connecting elements are connected to the top part and/or to the bottom part in each case via a film hinge. Moreover, the windshield wiper device has a stop device, which is configured to delimit a rotational movement of the connecting elements in relation to at least one of the elongated top part and the elongated bottom part.

Preferred embodiments and particular aspects of the invention will become apparent from the dependent claims, the drawings and the present description.

The present invention and the embodiments thereof advantageously make it possible for the windshield wiper device to be adapted in a particularly effective manner to the curvature of a windshield. Unwiped regions of the windshield and fogging on the windshield can be largely avoided. Furthermore, a windshield wiper device which is particularly resistant is provided by the design configuration of the windshield wiper device described herein with the stop device according to the embodiments described herein. In particular, the embodiments described herein can avoid excessive loading of the film hinges, and this leads to a high longevity of the windshield wiper device.

According to embodiments of the disclosure, the stop device is formed by virtue of the fact that the film hinge is arranged at least partially in a cutout in the elongated top part and/or bottom part, in particular in a cutout in the elongated bottom part. This provides a windshield wiper device which makes it possible to avoid excessive loading of the film hinges. In particular, a rotational movement of the connecting elements in relation to the elongated top part and/or the elongated bottom part is delimited in such a manner that the film hinges, which are connected to the top part and/or to the bottom part, are protected from excessive loading.

According to further embodiments of the disclosure, which can be combined with other embodiments, the stop device is arranged at least at a multiplicity of the ends of the connecting elements and is formed by at least one widened end region at the multiplicity of the ends of the connecting elements, in order to delimit a rotational movement of the connecting elements in relation to the elongated top part and/or in relation to the elongated bottom part. This provides a windshield wiper device having a stop device which makes it possible to effectively avoid excessive loading of the film hinges.

According to yet further embodiments of the disclosure, which can be combined with other embodiments described herein, the stop device is formed by a multiplicity of extended sections, which are arranged on the elongated top part and/or bottom part and extend substantially transversely in relation to the longitudinal extent of the wiper blade, in order to delimit a rotational movement of a multiplicity of connecting elements in relation to the elongated top part and/or in relation to the elongated bottom part. This provides a windshield wiper device which makes it possible to effectively avoid excessive loading of the film hinges. Furthermore, the freedom of rotation of the connecting elements in relation to the elongated top part or in relation to the elongated bottom part can be set via the spacing between the extended sections and the connecting elements.

According to embodiments of the disclosure, which can be combined with other embodiments described herein, the film hinge is formed in one piece with the connecting element and/or the top part or the bottom part. The single-piece configuration of the film hinges allows for simple and cost-effective production. The wiper blades or the windshield wiper devices can therefore be provided in an off-tool manner if they are configured correspondingly. In addition, the use of film hinges, in particular the single-piece design of the film hinges with the connecting elements and the top part or the bottom part, makes production by an injection molding process possible.

According to embodiments of the disclosure, which can be combined with other embodiments described herein, the film hinge has a thickness of 0.1 mm to 0.8 mm, in particular 0.2 to 0.4 mm. In this case, the dimensioning of the film hinge thicknesses allows for the flexural rigidity to be set to a predetermined value. According to embodiments described herein, the film hinges typically have a flexural rigidity of 75 Nmm/rad or less.

According to embodiments of the disclosure, which can be combined with other embodiments described herein, the film hinge consists of at least one material selected from the group consisting of: POM, PA, TPE, in particular TPE-S, TPE-O, TPE-U, TPE-A, TPE-V and TPE-E. The material selection for the film hinges, in particular in conjunction with the thickness of the hinges, allows for a flexural rigidity at a predetermined value or therebelow and moreover makes production by an injection molding process possible, in particular a 2-component injection molding process, given appropriate properties of the wiper blade, e.g. an adequate creep resistance of the film hinges.

According to embodiments of the disclosure, which can be combined with other embodiments described herein, the film hinge has at least a first aperture transversely in relation to a longitudinal extent of the film hinge. The rigidity of the film hinge can be set by the dimensioning of the first aperture, for example by the length and height of the first aperture.

According to embodiments of the disclosure, which can be combined with other embodiments described herein, in a region in which the film hinge is arranged, the top part has at least a second aperture in the direction of thickness of the top part. The rigidity of the film hinge can be set by the dimensioning of the second aperture, for example by the length of the second aperture and the width of the second aperture.

BRIEF DESCRIPTION OF THE DRAWINGS

Exemplary embodiments of the invention are illustrated in the figures and will be described in more detail hereinbelow. In the drawings.

DETAILED DESCRIPTION

Unless stated otherwise, the same reference signs are used hereinbelow for identical elements and elements with an identical action.

Figure 1:
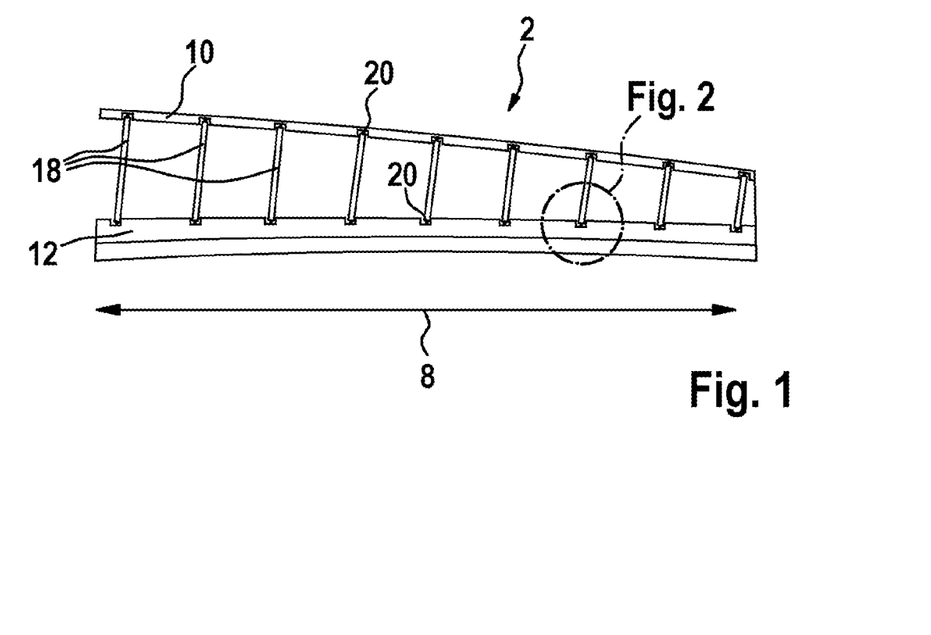
FIG. 1 shows a schematic illustration of a section of a wiper blade of a windshield wiper device according to embodiments of the disclosure.

FIG. 1 shows a schematic illustration of a section of a wiper blade 2 of a windshield wiper device according to embodiments of the disclosure. The wiper blade 2 of the windshield wiper device comprises an elongated top part 10 and an elongated bottom part 12, which are configured to be at least partially bendable. Moreover, provision is made of a plurality of connecting elements 18 for connecting the top part 10 and the bottom part 12, wherein the connecting elements 18 are spaced apart from one another along a longitudinal extent 8 of the wiper blade. The connecting elements 18 are configured to allow for a movement of the top part 10 and of the bottom part 12 in relation to one another with a movement component along a longitudinal extent 8 of the wiper blade. Furthermore, the connecting elements are connected to the top part 10 and/or to the bottom part 12 in each case via a film hinge 20.

This provides a windshield wiper device with which it is possible to ensure particularly effective and exact wiping of the windshield. Unwiped regions of the windshield and fogging on the windshield can be largely avoided. Furthermore, precise adaptation of the windshield wiper device to changes in curvature which arise within the windshield is made possible by the design configuration of the windshield wiper device described herein. A largely uniform contact pressure on the windshield wiper device, in particular on the bottom part thereof, is achieved even given high degrees of curvature and changes in curvature of the windshield. Compared to conventional windshield wiper devices, it is advantageously not necessary in the case of the windshield wiper device according to the invention to perform a preceding adjustment of the top part and/or of the bottom part to the curvature of the windshield to be wiped. In the case of the windshield wiper device according to the invention, the adaptation to the curvature of the windshield is effected quickly and in an uncomplicated manner and largely independently. For the sake of simplicity, one and the same windshield wiper device can therefore be used for a large number of vehicles.

Figure 2:
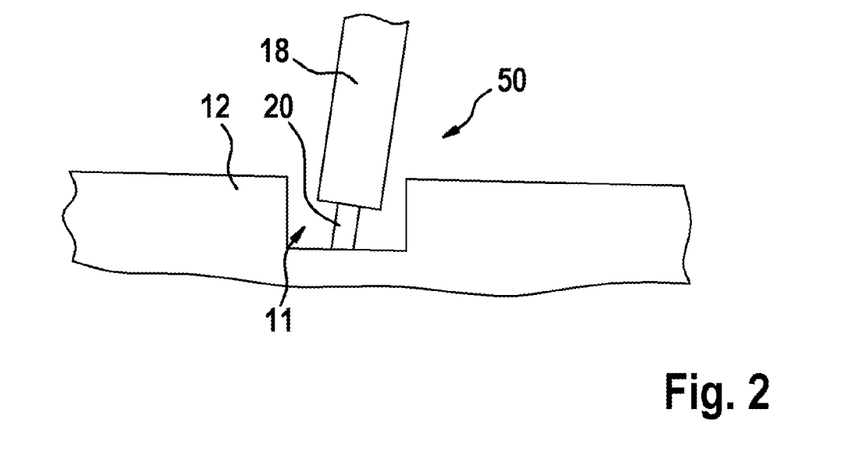
FIG. 2 shows a schematic illustration of a stop device of the windshield wiper device according to embodiments of the disclosure.
Figure 3A:
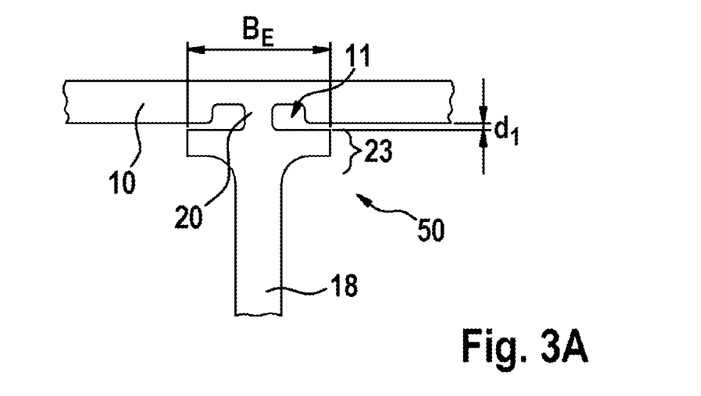
FIG. 3A shows a schematic illustration of a stop device of the windshield wiper device according to embodiments of the disclosure.
Figure 3B:
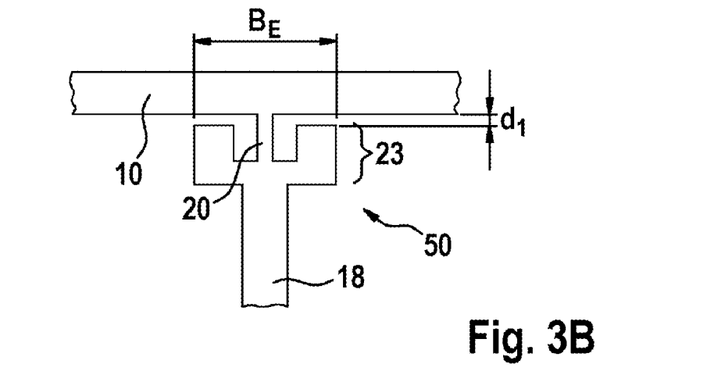
FIG. 3B shows a schematic illustration of a stop device of the windshield wiper device according to embodiments of the disclosure.
Figure 3C:
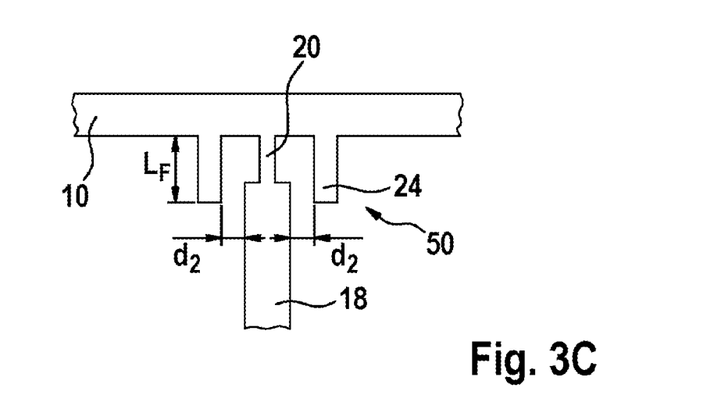
FIG. 3C shows a schematic illustration of a stop device of the windshield wiper device according to embodiments of the disclosure.

According to embodiments of the disclosure, the windshield wiper device has a stop device 50. Exemplary embodiments of the stop device are shown in FIGS. 2 to 3C. According to the embodiments described herein, the stop device 50 is configured in order to delimit a rotational movement of the connecting elements 18 in relation to at least one of the elongated top part 10 and the elongated bottom part 12. According to embodiments of the disclosure, which can be combined with other embodiments described herein, the stop device 50 is formed by virtue of the fact that the film hinge 20 is arranged at least partially in a cutout 11 in the elongated bottom part 12, as is shown by way of example in FIG. 2. Furthermore, the stop device 50 can also be formed by virtue of the fact that the film hinge 20 is arranged at least partially in a cutout in the elongated top part 10 and/or in the elongated bottom part 12.

This provides a windshield wiper device which on the one hand allows for particularly effective adaptation to the curvature of a windshield and on the other hand is resistant. In particular, a windshield wiper device which makes it possible to avoid excessive loading of the film hinges is provided by the embodiments described herein with the stop device. The provision of a stop device according to the embodiments described herein delimits a rotational movement of the connecting elements in relation to the elongated top part and/or the elongated bottom part in such a manner that the film hinges, which are connected to the top part and/or to the bottom part, are protected from excessive loading.

According to embodiments of the disclosure, the stop device 50 can also be arranged at least at a multiplicity of the ends of the connecting elements 18 and can be formed by at least one widened end region 23 at the multiplicity of the ends of the connecting elements 18, as is shown by way of example in FIG. 3A. In this case, one connecting element of the multiplicity of connecting elements can have a widened end region at one end or at both ends. This makes it possible to delimit a rotational movement of the connecting elements 18 in relation to the elongated top part 10 and/or in relation to the elongated bottom part 12. The freedom of rotation of the connecting elements in relation to the elongated top part and/or in relation to the elongated bottom part can be set via the width $B_E$ of the widened end region of the connecting elements 18. Furthermore, the freedom of rotation of the connecting elements in relation to the elongated top part or in relation to the elongated bottom part can be set via the spacing $d_1$ between the widened end region of the connecting elements 18 and the elongated top part 10 or the elongated bottom part 12.

FIG. 3A shows a section of an exemplary embodiment in which the connecting element 18 has a widened end region 23 and the film hinge 20 is arranged in a cutout 11 in the elongated top part. According to embodiments of the disclosure, as is shown by way of example in FIG. 3B, the connection between the connecting element 18 and the top part 10 can also be provided without a cutout 11.

FIG. 3B shows a schematic illustration of an embodiment of the stop device, which, similarly to the stop device shown in FIG. 3A, is formed by at least one widened end region 23 at the multiplicity of the ends of the connecting elements 18, wherein the widened end region 23 has a U-shaped form such that the ends of the U-shaped end region of the connecting elements 18 can delimit a rotational movement of the multiplicity of connecting elements 18 in relation to the elongated top part 10 and/or in relation to the elongated bottom part 12. As is shown by way of example in FIG. 3B, the film hinge 20 can be accommodated at least partially in the U-shaped end region of the connecting elements 18.

The freedom of rotation of the connecting elements in relation to the elongated top part and/or in relation to the elongated bottom part can be set via the width $B_E$ of the widened U-shaped end region of the connecting elements 18. Furthermore, the freedom of rotation of the connecting elements in relation to the elongated top part or in relation to the elongated bottom part can be set via the spacing $d_1$ between the ends of the U-shaped widened end region of the connecting elements and the elongated top part or the elongated bottom part.

According to embodiments of the disclosure, the stop device 50, as is shown by way of example in FIG. 3C, can also be formed by a multiplicity of extended sections 24, which are arranged on the elongated top part 10 and/or the elongated bottom part 12. It is typically the case that the extended sections 24 extend substantially transversely in relation to the longitudinal extent 8 of the wiper blade, in particular in the direction of the connecting elements in a basic position of the windshield wiper device. It is thereby possible to delimit a rotational movement of a multiplicity of connecting elements 18 in relation to the elongated top part 10 and/or in relation to the elongated bottom part 12, such that the film hinges, which are connected to the top part and/or to the bottom part, are protected from excessive loading. The freedom of rotation of the connecting elements in relation to the elongated top part and/or in relation to the elongated bottom part can be set via the length $L_F$ of the extended sections 24. Furthermore, the freedom of rotation of the connecting elements in relation to the elongated top part or in relation to the elongated bottom part can be set via the spacing $d_2$ between the extended sections 24 and the connecting elements 18.

In contrast to the embodiment shown by way of example in FIG. 2, in the case of the embodiments shown by way of example in FIGS. 3A to 3C the film hinge does not have to be arranged in a cutout in the elongated top part 10 or the elongated bottom part. It is thereby possible to provide a stop device without influencing the stability of the elongated top part and/or the elongated bottom part.

According to typical embodiments, which can be combined with other embodiments, provision can be made of a cutout for delimiting the rotation of the film hinge, i.e. a stop device with cutout, in particular on the bottom part 12. According to further typical embodiments, which can be combined with other embodiments, provision can be made to delimit the rotation of the film hinge without a cutout, i.e. a stop device without cutout, in particular on the top part 10. In this context, a cutout refers, for example, to a tapering of the material thickness of the top part or bottom part perpendicular to the longitudinal extent of the wiper blade.

According to the embodiments of the windshield wiper device described herein, the stop device 50, as is shown by way of example in FIGS. 2 to 3C, is configured in such a manner as to make possible rotation of the connecting elements in relation to the elongated top part or in relation to the elongated bottom part of at most ±45°, in particular at most ±30°, in particular at most ±15°.

According to embodiments of the disclosure, as are shown by way of example in FIGS. 2 to 3C, the film hinge 20 is formed in one piece with the connecting element 18 and/or the top part 10 or the bottom part 12. The single-piece configuration of the film hinges allows for simple and cost-effective production. The wiper blades or the windshield wiper devices can thus be provided in an off-tool manner if they are configured correspondingly.

According to embodiments, which can be combined with other embodiments, a film hinge, in particular a film hinge 20 configured in one piece with the connecting element 18, can be provided in such a manner that the width of the connecting element 18 outside the hinge region is from 1 mm to 3 mm, for example 1.5 mm, and the width in the region of the film hinge is from 0.1 mm to 0.8 mm, in particular 0.2 to 0.4 mm, for example 0.3 mm. The dimensioning of the film hinge thicknesses makes it possible to set the flexural rigidity to a predetermined value. In addition, the use of film hinges, in particular the single-piece configuration of the film hinges with the connecting elements and the top part 10 or the bottom part 12, makes production by an injection molding process possible.

According to embodiments of the disclosure, which can be combined with other embodiments, the film hinge can be made of a material selected from the group consisting of: POM, PA, TPE (thermoplastic elastomer), in particular TPE-S, TPE-O, TPE-U, TPE-A, TPE-V and TPE-E. The material selection for the film hinges, in particular in conjunction with the thickness of the hinges, allows for a flexural rigidity at a predetermined value or therebelow, and moreover makes production by an injection molding process possible, in particular in a 2-component injection molding process, given appropriate properties of the wiper blade, i.e. an adequate creep resistance of the film hinges. According to embodiments described herein, the film hinges typically have a flexural rigidity of 75 Nmm/rad or less.

According to the embodiments described herein, it is possible to select materials in such a manner that film hinge properties which allow for a reliable or durable film hinge are provided even in the case of high temperature variations and/or in the case of continuously high ambient temperatures. It is therefore possible for reliable wiper devices to also be provided for relatively complex fields of use.

Figure 4A:
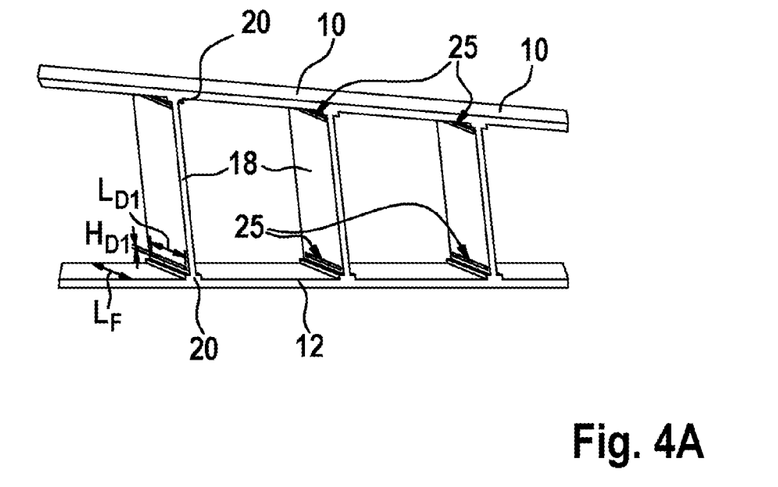
FIG. 4A shows a schematic illustration of a film hinge of the windshield wiper device according to embodiments of the disclosure.

According to embodiments of the disclosure, which can be combined with other embodiments, the film hinge 20 has at least a first aperture 25 transversely in relation to a longitudinal extent $L_F$ of the film hinge 20. As is shown by way of example in FIG. 4A, the film hinge can be provided by virtue of the fact that a first aperture 25 is provided at the end of the connecting element 18 which is connected to the top part 10 or the bottom part 12, such that the rigidity of the hinge region can be set by means of the aperture 25. The rigidity of the film hinge can be set by the dimensioning of the first aperture 25, for example by the length $L_{D1}$ of the first aperture and the height $H_{D1}$ of the first aperture.

Figure 4B:
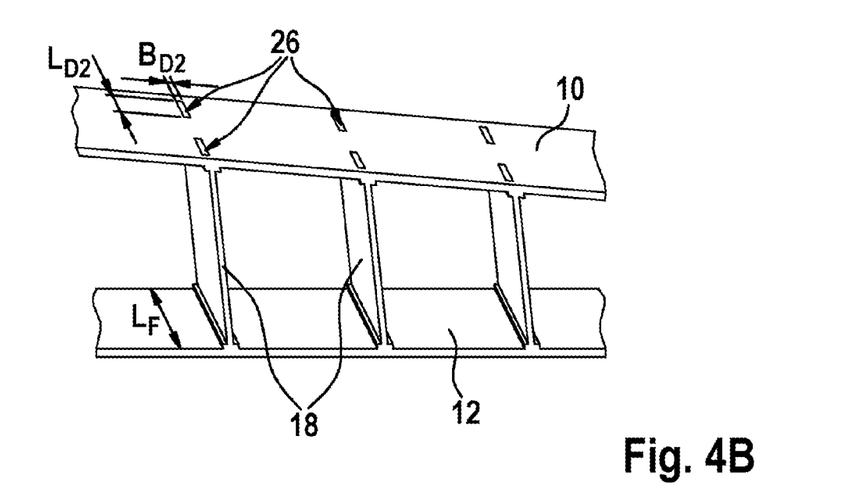
FIG. 4B shows a schematic illustration of a film hinge of the windshield wiper device according to embodiments of the disclosure.

According to embodiments of the disclosure, which can be combined with other embodiments, in a region in which the film hinge 20 is arranged, the elongated top part 10 of the windshield wiper device has at least a second aperture 26 in the direction of thickness of the top part 10. As is shown by way of example in FIG. 4B, the film hinge can be provided by virtue of the fact that, in a region in which the film hinge is to be arranged, the elongated top part 10 of the windshield wiper device has a second aperture 26 in the direction of thickness of the top part 10. The rigidity of the film hinge can be set by the dimensioning of the second aperture 26, for example by the length $L_{D2}$ of the second aperture and the width of the second aperture $B_{D2}$.

The text which follows describes exemplary embodiments of the windshield wiper device, for which the stop device described herein can advantageously be used.

Figure 5A:
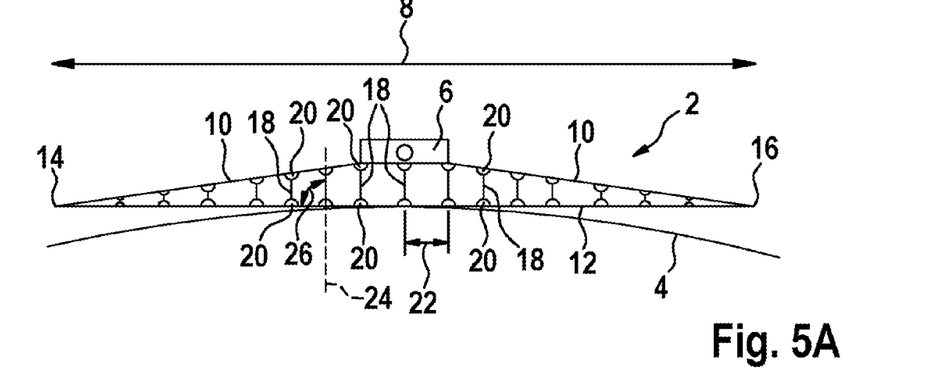
FIG. 5A shows a schematic illustration of a wiper blade of a windshield wiper device according to embodiments of the disclosure in a basic position.
Figure 5B:
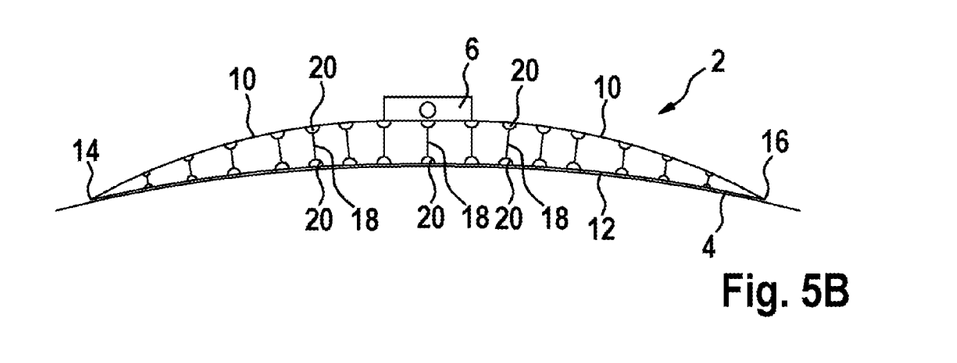
FIG. 5B shows a schematic illustration of the wiper blade of a windshield wiper device according to embodiments of the disclosure according to FIG. 5A in a position applied to a windshield.

FIGS. 5A and 5B show schematic illustrations of a wiper blade 2 in a basic position (FIG. 5A) and in a position applied to a windshield (FIG. 5B) according to embodiments of the windshield wiper device of the disclosure. The wiper blade 2 serves for wiping a windshield 4 of a vehicle, which for example is a motor vehicle, in particular an automobile. The wiper blade 2 is conventionally fitted to a windshield wiper arm, which is driven by means of a motor for wiping. For this purpose, the wiper blade 2 has a mount 6, at which it can be fastened on the windshield wiper arm. In FIG. 5A, the wiper blade 2 is in a basic position, in which it is raised at least partially from the windshield 4. The wiper blade 2 has a longitudinal extent 8 and has an elongated top part 10 and a likewise elongated bottom part 12. The longitudinal extents of the top part 10 and of the bottom part 12 correspond substantially to the longitudinal extent 8 of the wiper blade 2.

Both the top part 10 and the bottom part 12 are bendable bars or can be configured as bendable bars, these being formed in a single piece in each case by way of example in FIGS. 5A and 5B. This makes a particularly stable design possible. It is similarly possible to configure only in each case part of the top part 10 and/or of the bottom part 12 in bendable form. Furthermore, it is alternatively possible for the top part 10 to be configured in two pieces, in which case one end of each of the two pieces of the two-piece top part 10 is fastened on the mount 6.

According to some embodiments, which can be combined with the other embodiments described here, a material having a modulus of elasticity in a range of between 0.005 kN/mm² and 0.5 kN/mm², in particular 0.01 kN/mm² and 0.1 kN/mm², is used for the top part 10 and/or the bottom part 12. This allows for a suitable bending capacity of the top part 10 and of the bottom part 12. Together with a suitably configured cross-sectional area of the top part 10 and of the bottom part 12, this gives rise to an optimum flexural rigidity. The top part 10 and the bottom part 12 are arranged in such a way that they lie opposite one another. Both ends of the top part 10 are fixedly connected to a respective end of the bottom part 12 at outer connecting positions 14 and 16. Otherwise, the top part 10 and the bottom part 12 are spaced apart from one another.

The top part 10 and the bottom part 12 are connected to one another by connecting elements 18. In particular in the basic position of the wiper blade 2, these connecting elements extend approximately transversely in relation to the longitudinal extent 8 of the wiper blade 2. The connecting elements 18 are fastened to mutually facing inner longitudinal sides of the top part 10 and of the bottom part 12 by means of film hinges 20. As a result of the use of film hinges, the top part 10, the bottom part 12 and/or the connecting elements 18 can be produced from a plastic material.

According to typical embodiments described here, which can be combined with other embodiments described here, a film hinge can be provided by a tapering of the material of the connecting elements to produce a lower rigidity of the connecting elements in the hinge region, for example between the connection of the top part to the connecting element or between the connection of the lower part to the connecting element.

Embodiments in which the joint is provided by a film hinge consequently provide a very simple manner of providing the joints for a fin-ray wiper. The wiper blade 2 can be provided in one piece, in particular in an off-tool manner. According to typical embodiments, the film hinges have a high expandability. This may be provided, for example, by a material selected from the group consisting of: POM, PA, TPE (thermoplastic elastomer), in particular TPE-S, TPE-O, TPE-U, TPE-A, TPE-V and TPE-E.

The connecting elements 18 are spaced apart from one another along the longitudinal extent of the wiper blade 2. The spacings between two respective adjacent connecting elements 18 are the same. They can also be chosen to be different, however. The spacings are advantageously smaller than 50 mm, in particular smaller than 30 mm. It is thereby possible to ensure particularly high flexibility of the windshield wiper device, in particular the bottom part thereof, and good adaptation to the curvature and changes in curvature of the windshield to be wiped.

FIG. 5A shows a spacing 22 as a representative of the spacings between two respective connecting elements 18. In particular in the basic position of the wiper blade 2, the connecting elements 18 are fastened to the bottom part 12 in such a way that the longitudinal axes thereof extend at angles 26 in relation to the bottom part 12 which lie between 65° and 115°, in particular between 75° and 105°. It is particularly advantageous for the angles to lie between 80° and 100°. This advantageously ensures that a force acting on the bottom part is transferred in a particularly effective manner to the top part. Furthermore, a particularly stable windshield wiper device can be achieved in this way. This similarly applies to the way in which the connecting elements 18 are fastened to the top part 10.

FIG. 5A shows a longitudinal axis 24 as an example of the longitudinal axes of the connecting elements 18 and an angle 26 as an example of the angles between the connecting elements 18 and the bottom part 12. The spacings between the top part 10 and the bottom part 12 are determined primarily by the lengths of the connecting elements 18. The lengths of the connecting elements 18 increase, starting from the two outer connecting positions 14, 16 as far as approximately to those positions at which the mount 6 fitted to the top part 10 begins. As a result, in the side view of the wiper blade 2 according to FIG. 5A, the top part 10 and the bottom part 12 form a double wedge, the tips of the two wedges pointing in opposite directions. The connecting elements 18 are resistant to buckling.

FIG. 5B shows a schematic illustration of the wiper blade 2 according to FIG. 5A in a position applied to the windshield 4. Since the windshield 4 has a curvature, when the wiper blade 2 is applied to the windshield 4, contact pressure forces act on the bottom part 12. Since the top part 10 and the bottom part 12 are bendable bars, and the connecting elements 18 are mounted rotatably on the top part 10 and bottom part 12, the top part 10 and the bottom part 12 can be displaced in relation to one another. As a result of the pressure forces acting from below on the bottom part 12, the wiper blade 2 bends in the direction from which the pressure forces originate and is applied precisely with respect to the curvature of the windshield 4.

As a result of the structure of the embodiments described here, when a force acts on the bottom part (as a result of the windshield 4), the bottom part bends in the direction from which the force acts. This is produced by the connection of the top part 10 and of the bottom part at a connecting position 14 and/or 16, the shape and by film hinges at the connection between the connecting elements and the top or bottom part.

In the illustration according to FIG. 5B, there is a small spacing between the wiper blade 2 and the windshield 4, this spacing serving here only to illustrate the windshield 4 and the wiper blade 2 and in reality not being present to such a large extent when the wiper blade 2 is applied to the windshield 4. In addition, a wiper lip resting on the windshield 4 for wiping is typically located on the underside of the bottom part 12 remote from the top part 10. For reasons of clarity, the wiper lip is not shown in FIGS. 5A and 5B.

A windshield wiper device according to embodiments described here uses the effect of tail fins of specific fish, which in the event of lateral pressure do not deviate in the pressure direction, but instead curve in the opposite direction, that is to say in the direction from which the pressure originates. This principle is also referred to as the "fin-ray" principle. As a result, a windshield wiper device according to the embodiments described herein has the advantage of improved adaptation to a windshield of a motor vehicle. With a conventional windshield wiper blade, the top part thereof is generally rigid, that is to say it is formed so as not to be bendable.

FIGS. 5A and 5B show a wiper blade 2 with a longitudinal extent 8 extending substantially between the connecting positions 14 and 16. Such an arrangement is often used for front windshield wipers. Alternatively, however, a windshield wiper device may also have only one connecting position, this corresponding by analogy to FIGS. 5A and 5B to halving of the windshield wiper device, with an axis of rotation being provided, for example, at a position of the mount 6. Such an arrangement is often used for rear windshield wipers. This is shown by way of example, inter alia, in FIGS. 6A and 6B.

Optional configurations and details as are described in the individual embodiments can generally be used for both variants of an arrangement of a windshield wiper device.

Figure 6A:
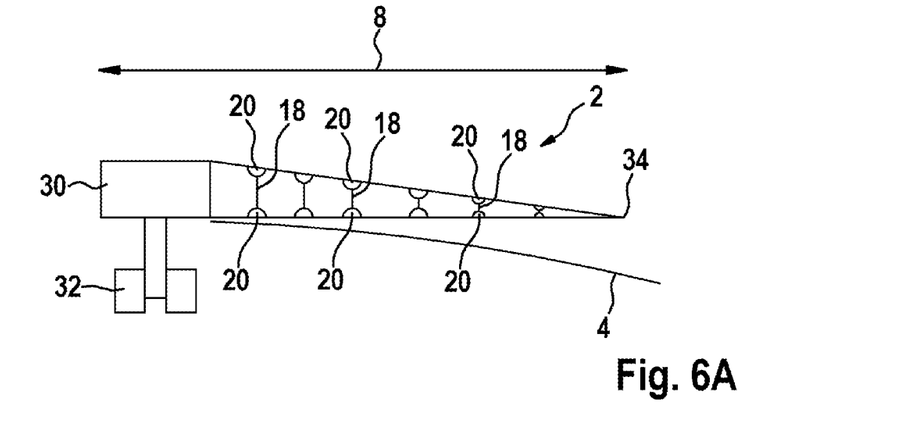
FIG. 6A shows a schematic illustration of a further exemplary embodiment of a windshield wiper device according to the invention in the form of a wiper arm having an integrated wiper blade in a basic position.

FIG. 6A shows a schematic illustration of a further exemplary embodiment of the windshield wiper device according to the invention in the basic position. Here, the windshield wiper device is a wiper arm with an integrated wiper blade 2, which is fitted to a fastening part 30. The fastening part 30 is connected to a wiper motor 32, which drives the fastening part 30 to wipe the windshield 4. The wiper blade 2 has a wedge-shaped configuration, one end of the top part 10 being fixedly connected to one end of the bottom part 12 at an outer connecting position 34. The respective other end of the top part 10 and of the bottom part 12 is fastened to the fastening part 30. Concerning the fundamental structure and in particular the fastenings of the connecting elements 18, the windshield wiper device according to FIG. 6A corresponds in principle to that according to FIG. 5A.

Figure 6B:
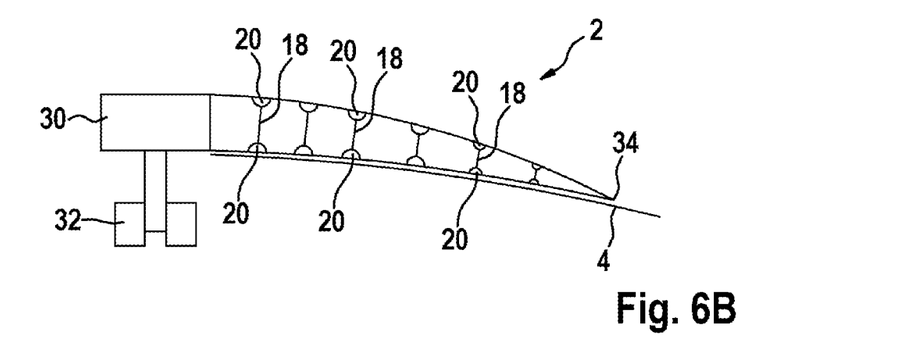
FIG. 6B shows a schematic illustration of the wiper arm having an integrated wiper blade according to FIG. 6A in a position applied to a windshield.

FIG. 6B shows a schematic illustration of the wiper blade 2 with an integrated wiper arm 30 according to FIG. 5B in a position applied to the windshield 4. Here, too, pressure forces act on the bottom part 12 of the wiper blade 2 from below from the direction of the windshield 4, such that the bottom part 12 and the top part 10 bend in the direction of the windshield 4.

Both FIG. 5A and FIG. 6A show the wiper blade in a position in which it is not applied to the windshield, in such a manner that the bottom part 12 has a substantially straight form. According to yet further embodiments, which can be combined with other embodiments, the bottom part has a convex form in the unloaded state, i.e. it has a curvature projecting away from the top part in a central region. On contact with a windshield, proceeding from the convex shape of the bottom part, the windshield wiper device according to the embodiments described here can then typically assume the corresponding concave shape of the bottom part which adapts to the windshield.

Figure 7:
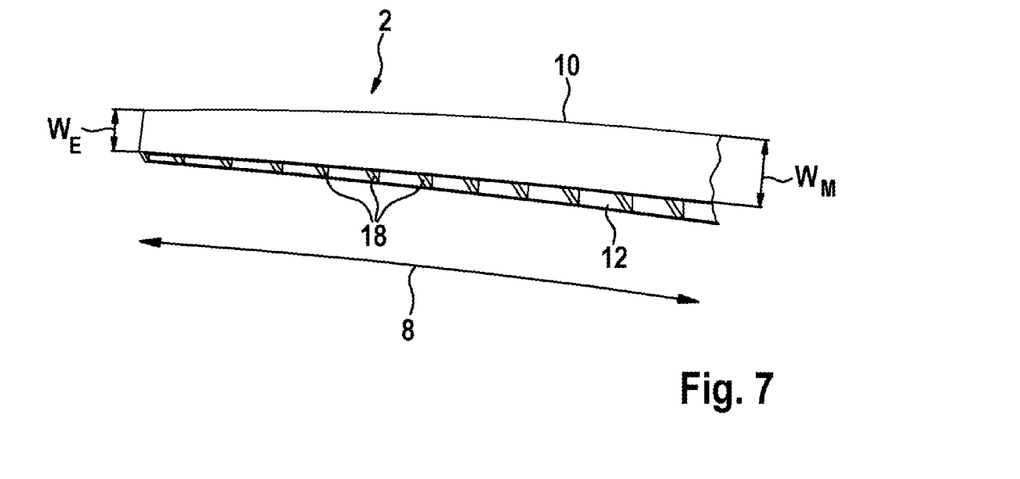
FIG. 7 shows a schematic perspective illustration of a wiper arm of a windshield wiper device according to embodiments of the disclosure.

FIG. 7 shows a schematic perspective illustration of a wiper blade 2 of a windshield wiper device according to embodiments of the disclosure. As is shown in FIG. 7, the wiper blade 2 has an outer width $W_E$ at the outer connecting positions, at which the ends of the elongated top part 10 and of the bottom part 12 are connected to one another. According to typical embodiments, the outer width $W_E$ is at least 15 mm, in particular at least 20 mm, in particular at least 25 mm.

According to embodiments of the disclosure, which can be combined with other embodiments, the width of the wiper blade 2 increases from the outer connecting positions in the direction of the fastening part 30 or of the mount 6, at which the wiper blade can be fastened to the windshield wiper arm. In FIG. 7, an inner width is denoted by way of example by $W_M$. According to typical embodiments, the inner width $W_M$ is at least 20 mm, in particular at least 25 mm, in particular at least 30 mm.

Figure 8A:
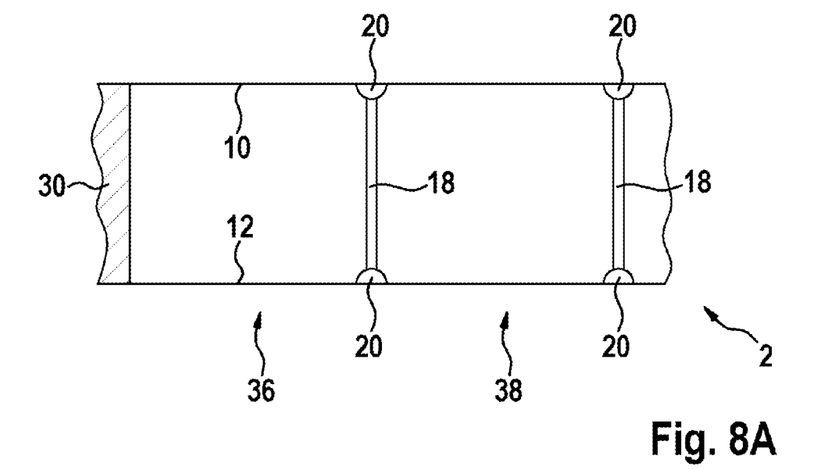
FIG. 8A shows a schematic illustration of a section of the wiper blade according to FIG. 6A.

FIG. 8A shows a schematic illustration of a section of the wiper blade 2 according to the exemplary embodiment shown in FIG. 6A, in which the wiper blade 2 is in the basic position. What is shown is the left-hand end region of the wiper blade 2, in which one end of the top part 10 and one end of the bottom part 12 are fastened to the fastening part 30. FIG. 8A shows, proceeding from the transition from the fastening part 30 to the wiper blade 2, the first two connecting elements 18, which delimit two wiper blade elements 36 and 38. The connecting elements 18 are fastened to the top part 10 and the bottom part 12 via film hinges 20.

Figure 8B:
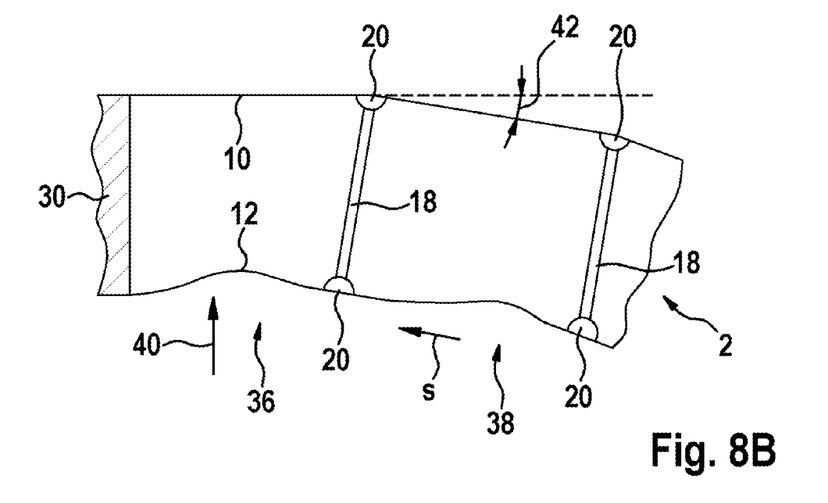
FIG. 8B shows a schematic illustration of a section of the wiper blade according to FIG. 6B.

FIG. 8B shows a schematic illustration of a section of the wiper blade 2 according to the exemplary embodiment shown in FIG. 6B, in which the wiper blade 2 is applied to the windshield 4. Pressure forces act on the bottom part 12 from below from the direction of the windshield. A pressure force 40 is shown in FIG. 8B as a representative of the pressure forces. The pressure force 40 curves and bends the bottom part 12 of the wiper blade element 36. As a result, the film hinge 20 of the first connecting element 18 is displaced to the left by a distance s. The second wiper blade element 38 bends downward in the direction from which the pressure force 40 originates, and clings to the windshield. This creates an angle 42 between the first wiper blade element 36 and the second wiper blade element 38. A further pressure force is also formed, this then acting on the bottom part 12 of the second wiper blade element 38 and preventing further bending of the second wiper blade element 38 downward. A chain reaction to the wiper blade element situated adjacently to the right occurs as far as the end of the wiper blade 2.

According to the embodiments described here, fin-ray windshield wiper devices for vehicle windshields can be produced in a particularly expedient manner and/or for a plurality of different fields of use. The present embodiments of the windshield wiper device with the stop device according to the embodiments described herein provide a windshield wiper device which is particularly resistant. In particular, the embodiments described herein can avoid excessive loading of the film hinges, this leading to a high longevity of the windshield wiper device.

What is claimed is:

1. A windshield wiper device for a vehicle, comprising a wiper blade (2) having
    an elongated top part (10), which is configured to be at least partially bendable,
    an elongated bottom part (12), which is configured to be at least partially bendable,
    a plurality of connecting elements (18) connecting the top part (10) and the bottom part (12), wherein the connecting elements (18) are spaced apart from one another along a longitudinal extent (8) of the wiper blade (2), wherein the connecting elements (18) are configured to allow for a movement of the top part (10) and of the bottom part in relation to one another with a movement component along the longitudinal extent (8) of the wiper blade (2),
    a film hinge (20) disposed between one of the connecting elements (18) and one of the top part (10) or the bottom part (12), wherein the film hinge is configured to flex and resiliently deform based on relative movement of the top and bottom parts (10, 12), and the connecting element (18) is configured to pivot relative to the one of the top part (10) or the bottom part (12) as the film hinge (20) flexes and resiliently deforms, wherein the film hinge has a first end fixed to the one of the top part (10) or bottom part (12), and a second opposite end fixed to an end of the connecting element (18) wherein the film hinge (20) has a thickness that is less than a thickness of the connecting element (18), and
    a stop device (50), which is configured to delimit a rotational movement of the one of the connecting elements (18) via the film hinge in relation to the one of the top part (10) or the bottom part (12) wherein the stop device (50) is a cutout in the top part (10) or the bottom part (12), wherein the cutout is defined by a first vertical wall, a second vertical wall disposed opposite the first vertical wall, and a horizontal wall extending between the first and second vertical walls, wherein the film hinge extends vertically from the horizontal wall and parallel to the first and second walls in an unstressed state.

2. The windshield wiper device as claimed in claim 1, wherein the stop device (50) is one of a plurality of stop devices arranged at least at a multiplicity of ends of the connecting elements (18) and is formed by at least one widened end region (23) at the end of one of the connecting elements, in order to delimit a rotational movement of the connecting element (18) in relation to the at least one of the top part (10) or the bottom part (12).

3. The windshield wiper device as claimed in claim 1, wherein the stop device (50) is one of a plurality of stop devices formed by a multiplicity of extended sections (24), which are arranged on the at least one of the top part and the bottom part and extend substantially transversely in relation to the longitudinal extent (8) of the wiper blade (2), in order to delimit a rotational movement of a multiplicity of connecting elements (18) in relation to the at least one of the top part and the bottom part, wherein each of extended sections (24) is a projection extending downwardly from top part toward the bottom part or upwardly from the bottom part toward the top part.

4. The windshield wiper device as claimed in claim 1, wherein the film hinge (20) is formed in one piece with the connecting element (18) and with one of the top part (10) or the bottom part (12).

5. The windshield wiper device as claimed in claim 1, wherein the film hinge (20) has a thickness of 0.1 mm to 0.8 mm.

6. The windshield wiper device as claimed in claim 1, wherein the film hinge (20) has a flexural rigidity of 75 Nmm/rad or less.

7. The windshield wiper device as claimed in claim 1, wherein the film hinge (20) is made at least partially of at least one of TPE-S, TPE-O, TPE-U, TPE-A, TPE-V or TPE-E.

8. The windshield wiper device as claimed in claim 1, wherein the film hinge (20) has at least a first aperture (25) transversely in relation to a longitudinal extent of the film hinge (20).

9. The windshield wiper device as claimed in claim 1, wherein, in a region in which the film hinge (20) is arranged, the top part (10) has at least a second aperture (26) in the direction of thickness of the top part (10).

10. The windshield wiper device as claimed in claim 1, wherein the film hinge (20) is produced by a 2-component injection molding process.

11. The windshield wiper device as claimed in claim 1, wherein the film hinge is one of a plurality of film hinges, wherein the connecting elements (18) are connected to both of the top part (10) and the bottom part (12) via the plurality of film hinges (20), wherein the stop device (50) is one of a plurality of stop devices configured to delimit a rotational movement of the connecting elements (18) in relation to the top part (10), and wherein at least one additional stop device (50) is configured to delimit a rotational movement of the connecting elements (18) in relation to the bottom part (12).

12. The windshield wiper device as claimed in claim 1, wherein the at least one additional stop device (50) is formed by virtue of the fact that the film hinge (20) is arranged at least partially in a cutout (11) in the bottom part (12).

13. The windshield wiper device as claimed in claim 1, wherein the film hinge (20) has a thickness of 0.2 to 0.4 mm.

14. The windshield wiper device as claimed in claim 1, wherein the film hinge is a living hinge, and has a flexural rigidity less than that of the connecting element.

15. The windshield wiper device as claimed in claim 1, wherein the cutout defines an open recess having a width measured along the longitudinal extent (8) that is greater than a width of the film hinge measured along the longitudinal extent (8), such that the film hinge is able to flex within the recess.

16. The windshield wiper device as claimed in claim 15, wherein the end of the connecting element is disposed within the cutout, and wherein the film hinge has a thickness that is less than a thickness of the connecting element.

17. The windshield wiper device as claimed in claim 2, wherein the widened end region has a width that is greater than a width of a remainder of the connecting element, and wherein the width of the connecting element is greater than a width of the film hinge.

18. The windshield wiper device as claimed in claim 2, wherein the widened end region has a U-shaped profile having two parallel arms that each extend toward one of the top part or bottom part, and wherein the film hinge extends between the two parallel arms.

* * * * *